United States Patent
Grot

(10) Patent No.: US 6,641,862 B1
(45) Date of Patent: Nov. 4, 2003

(54) PREPARATION OF FUEL CELL ELECTRODE ASSEMBLIES

(75) Inventor: Stephen Andreas Grot, Newark, DE (US)

(73) Assignee: Ion Power, Inc., Newark, DE (US)

( * ) Notice: Subject to any disclaimer, the term of this patent is extended or adjusted under 35 U.S.C. 154(b) by 204 days.

(21) Appl. No.: 09/710,975

(22) Filed: Nov. 10, 2000

Related U.S. Application Data

(63) Continuation-in-part of application No. 09/669,623, filed on Sep. 25, 2000, now abandoned.
(60) Provisional application No. 60/155,578, filed on Sep. 24, 1999.

(51) Int. Cl.[7] .............................................. H01M 4/88
(52) U.S. Cl. .......................................... 427/115; 429/41
(58) Field of Search ...................... 429/40–44; 427/115; 502/101

(56) References Cited

U.S. PATENT DOCUMENTS

| | | | |
|---|---|---|---|
| 3,134,696 A | | 5/1964 | Douglas et al. |
| 4,876,115 A | | 10/1989 | Raistrick |
| 5,242,764 A | | 9/1993 | Dhar |
| 5,318,863 A | | 6/1994 | Dhar |
| 5,945,231 A | * | 8/1999 | Narayanan et al. ............ 429/30 |
| 5,998,057 A | * | 12/1999 | Koschany et al. ........... 204/283 |
| 6,057,054 A | * | 5/2000 | Barton et al. ............... 29/623.1 |
| 6,074,692 A | * | 6/2000 | Hulett ......................... 427/115 |

OTHER PUBLICATIONS

"Nafion" Product Bulletin, Dupont Company, May 7, 1986.

* cited by examiner

Primary Examiner—Susy Tsang-Foster
(74) Attorney, Agent, or Firm—Huntley & Associates, LLC

(57) ABSTRACT

A method of manufacturing fuel cell membrane electrode assemblies using solution cast films, and the resulting electrode assemblies. The assemblies are prepared by applying a catalyst slurry onto a decal, subsequently applying ionomer solution and at least partially curing the ionomer.

17 Claims, 4 Drawing Sheets

PREPARATION OF FUEL CELL ELECTRODE ASSEMBLIES

CROSS-REFERENCE TO RELATED APPLICATIONS

This application is a Continuation-in-Part of application Ser. No. 09/669,623, filed on Sep. 25, 2000, now abandoned, which claims the benefit of U.S. provisional application No. 60/155,578 filed Sep. 24, 1999.

BACKGROUND OF THE INVENTION

The components of a Proton Exchange Membrane (PEM) fuel cell Membrane Electrode Assembly (MEA) typically include a membrane, one or more catalyst layers and a gas diffusion layer. The membrane performs a proton transport function in the cell, and provides electronic isolation between anode and cathode, thus providing a means of keeping fuel and oxidant from mixing. Typically, the membrane is between 10 and 200 microns thick, and is prepared from ionomer resin. Representative of such structures are those described in Raistrick, U.S. Pat. No. 4,876,115.

The catalyst layers are generally included on both the anode and cathode. The catalyst is typically contained in a matrix of catalyst material and binder. The binder material can be ionomer, PTFE or other material to hold the catalyst powder in place. Typically, the catalyst layers are formed by suspending the catalyst particles in a solution of binder and solvents to form a slurry. The slurry is then coated, dried and cured. Alternative catalyst structures can be created that contain large surface areas of catalyst materials. The catalyst structures are typically between 2 and 50 microns thick.

The gas diffusion layers are included on both the anode and the cathode. Typically, the gas diffusion layers are constructed of carbon/graphite cloth, felt, paper, wire screen, or some other porous material. The diffusion layers are placed between the catalyst layers and the gas flow channels of the cell. The gas diffusion layer permits diffusion of reactant gas to the catalyst layer, and current collection from the catalyst layer. The gas diffusion layers are typically between 100 to 500 microns in thickness.

Currently, the construction of the above components into a fuel cell can be divided into two main categories, these involving attachment of the catalyst layer either to the membrane or to the gas diffusion layer. For example, Dhar, in U.S. Pat. No. 5,318,863, describes the preparation of solid polymer fuel cells having two gas diffusion electrodes, each coated on one side with a catalyst slurry and cured, followed by depositing a solution of proton conducting material on the central portion of the surface of each gas diffusion electrode and bringing the two electrodes together.

SUMMARY OF THE INVENTION

The present invention provides a process for the formation of the membrane component of the fuel cell by solution casting.

Specifically, the instant invention provides a method of manufacturing a membrane electrode assembly component comprising:

a. applying a catalyst slurry onto a removable decal;
b. drying the catalyst slurry;
c. applying at least one ionomer solution on the catalyst layer; and
d. at least partially curing the at least one ionomer solution layer; to form a membrane electrode assembly component.

The resulting coated electrodes are then brought together, preferably with a non-conductive gasket around the perimeter of the ionomer, to form a membrane electrode assembly.

DETAILED DESCRIPTION OF THE INVENTION

The process of the present invention involves fabrication of a membrane electrode assembly using a solution cast film. The membrane is formed in situ and is never a separate component. The membrane electrode assembly can be made by several ways, as schematically shown in the Figures, in which like numbers refer to like elements.

Figure 1:
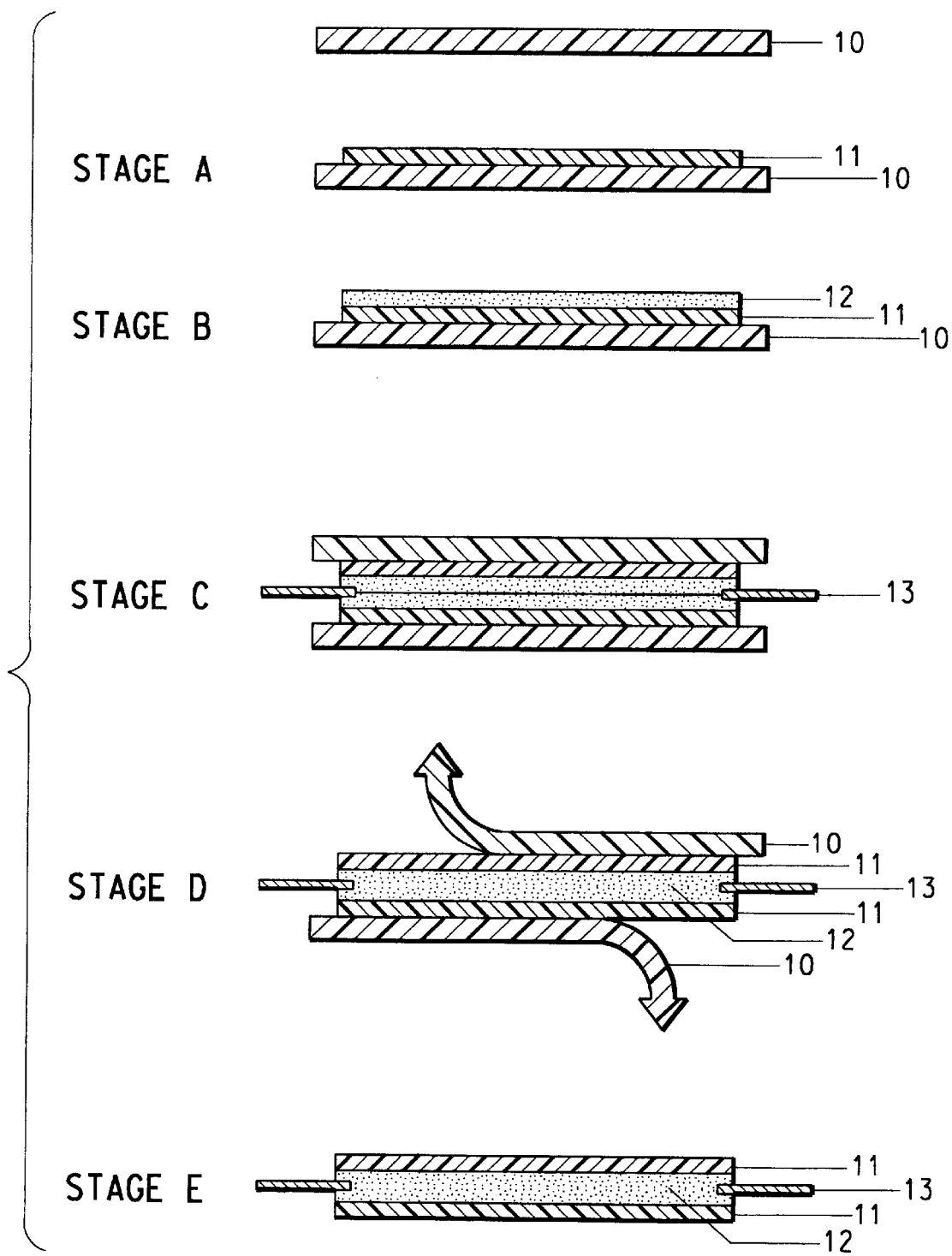
FIG. 1 is a schematic, cross-sectional illustration of the preparation of a membrane electrode assembly according to the present invention.

In FIG. 1, a blank decal 10 is coated with catalyst slurry 11, dried and preferably cured, to give a catalyst coated structure of Stage A. Decal materials can be selected from a wide variety of substrates. These materials can include cellulosic and polymeric materials. Generally, it is preferred that at least the decal material used to support the catalyst be porous, to permit uniform vapor release over the area coated with catalyst during the subsequent laminating steps. If polymeric films are used, those prepared from polytetrafluoroethylene (PTFE) and polyester are preferred. In general, preferred polyester materials include those prepared from biaxially oriented polyethylene terephthalate, and especially those bearing a silicone coating on at least one surface. These polyester films are particularly satisfactory as a substrate for the ionomer component of the present membrane electrode assemblies. Expanded PTFE has been found to be particularly satisfactory as a substrate for the catalyst component of the present structures.

The catalyst coated film is then further coated with ionomer solution 12 which is cured to give the structure of Stage B, which represents one half of a membrane electrode assembly. Two such half assemblies can then be assembled by pressing them together, with either low heat or conventional hot pressing techniques. The half assemblies are preferably assembled together with perimeter sealing material 13. This is illustrated as Stage C. As shown in this embodiment, the sealing material is partly embedded between the ionomer layers to anchor it in place. The amount of the sealing material embedded is a matter of design, varying, for example, with the material selected and the width of the perimeter seal. However, typically about 1–10% of the width of the perimeter sealing material can be beneficially embedded in the catalyst. The initial decal backing is then peeled away, as shown in Stage D, to give a finished MEA, as shown in Stage E. The resulting structure is an ionomer layer sandwiched between two catalyst layers. The solution cast ionomer layer becomes and serves the function of the membrane component of the electrode assembly. Several of the membrane electrode assemblies can be used to create an entire fuel cell.

Figure 2:
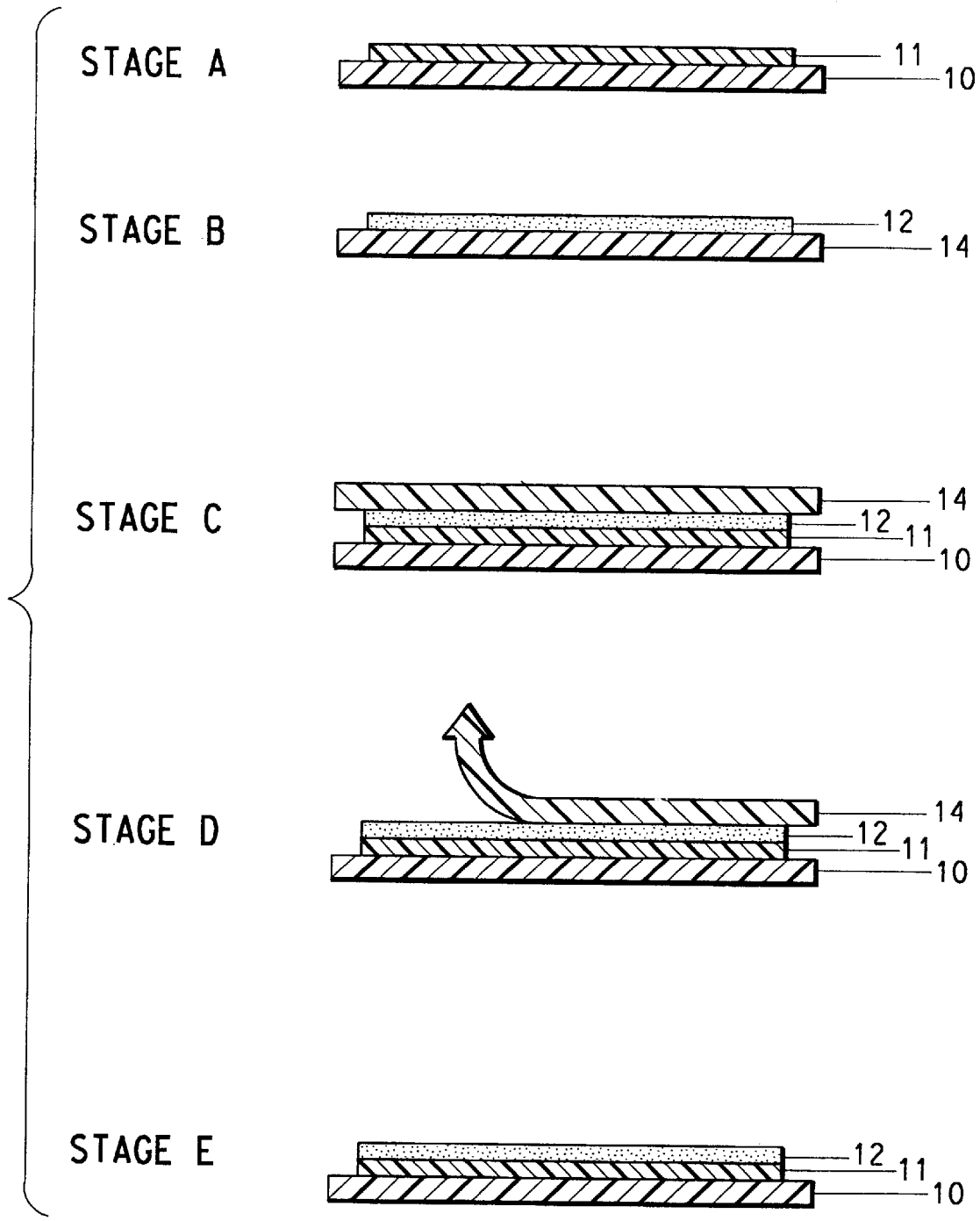
FIG. 2 is a schematic, cross-sectional illustration of an alternative preparation of an ionomer layer on the catalyst layer for use in a membrane electrode assembly according to the present invention.

After application of the catalyst and ionomer layers, each is dried and optionally cured at a temperature and for a time appropriate for that material. The specific times and temperatures will be known or readily determined by those skilled in the art. Curing of the ionomer can be carried out during final assembly of the MEA. An alternative fabrication sequence is illustrated in FIG. 2, in which catalyst layer 11 and ionomer layer 12 are applied to separate decal substrates 10 and 14, respectively, as shown in Stages A and B in FIG. 2. These are then assembled, as shown in Stage C. This can be done with conventional laminating or hot press equipment. Thereafter, the decal originally bearing the ionomer is peeled away, as shown in Stage D, to give the half MEA, ready for hot pressing, as shown in Stage E.

Figure 3:
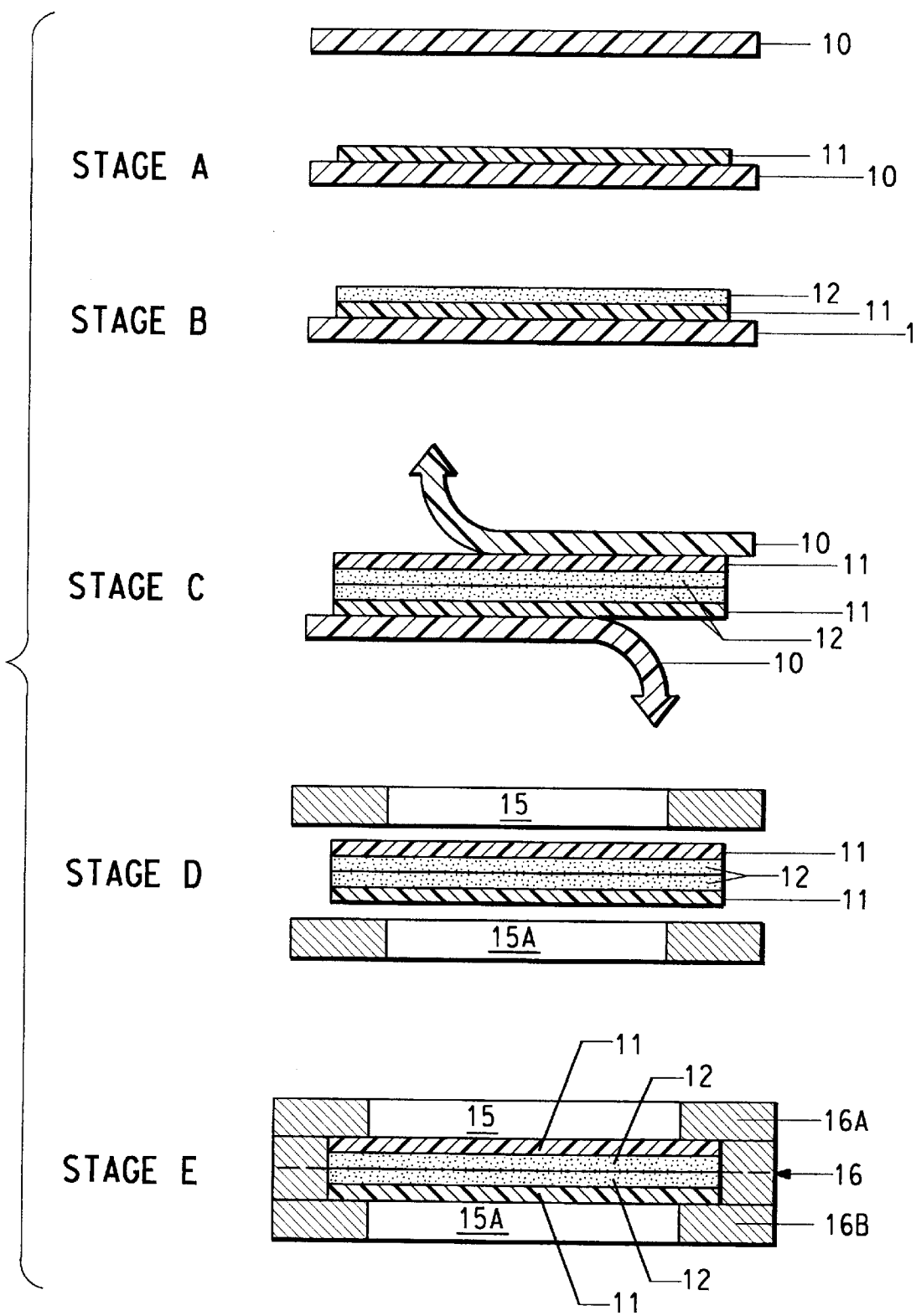
FIG. 3 is a schematic, cross-sectional illustration of an alternative preparation of a membrane electrode assembly according to the present invention.

Still another embodiment of the present invention is illustrated in FIG. 3. There, catalyst 11 and ionomer 12 are applied in Stages A and B, respectively. Two such half-MEAs are combined and the decals peeled away, as shown in Stage C. In Stages D and E, the laminate is assembled with diffusion media 15 and 15A, together with perimeter seal 16. The perimeter sealing material can be, and preferably is, applied to the edges of the gas diffusion medium in sufficient quantity to simultaneously infuse the diffusion media 15 and 15A and fill the edge gap between them. The perimeter sealing material can be selected from a wide variety of thermoplastic and elastomeric materials, depending on the conditions for processing and expected use for the electrode assemblies. For example, to the extent that the sealing material is to be diffused into the gas diffusion media, the sealing material should be soluble or dispersible in an appropriate carrier. Specific materials, dependant on these considerations, will be evident to those skilled in the art. It is preferred that the perimeter sealing material partly infuse the diffusion media layer, as shown by shaded areas 16A and 16B.

Figure 4:
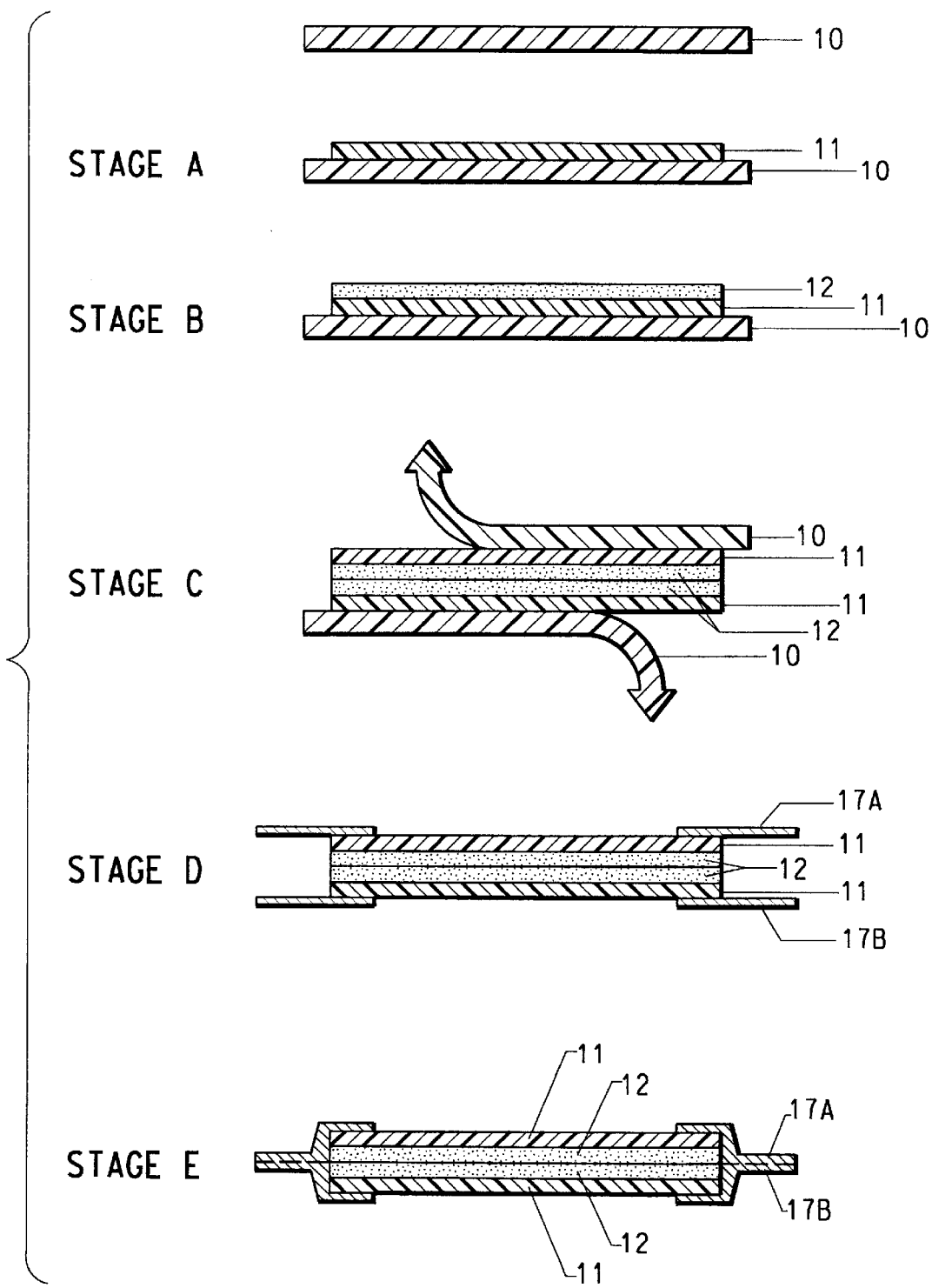
FIG. 4 is a schematic, cross-sectional illustration of still another alternative preparation of a membrane electrode assembly according to the present invention.

A further variation of the present invention is shown in FIG. 4, in which the perimeter sealing material 17 is a laminate, prepared from layers 17A and 17B.

One advantage of the fabrication sequence shown in FIGS. 3 and 4 is that registration and alignment of the two catalyst layers to be directly opposing each other is not needed as is the case of the embodiments shown in FIGS. 1 & 2. In fact the catalyst coated membrane can be formed in a continuous process on a moving webs that are laminated together. Registration is then only required with the sealing material, as applied, for example, as element 16 in FIG. 3 or as element 17 in FIG. 4. A further advantage of the embodiment shown in FIG. 3 becomes apparent during the final assembly of a fuel cell stack. During this process normally sealing components, diffusion media, and catalyst coated membrane need to be registered and aligned with manifold holes in bipolar plates. With the fabrication sequence shown in FIG. 3, the seals and diffusion media are automatically registered and fixed in place. In fact, the manifold holes can be formed after the completed structure in FIG. 3 is made by punching holes in the perimeter sealing containing region.

The advantages of the membrane electrode assembly fabrication methods of the present invention include efficient use of expensive ionomer as well as precise application of the membrane. For example, in practicing this invention, the membrane layers can be made very thin (less than 25 microns). By creating thin membranes, the ionic resistance of the fuel cell is reduced considerably. However, when working with very thin membranes, pin hole defects are a concern and can cause premature failure of the cell. Although very thin membrane layers are created in situ, by assembling two separate halves of a membrane assembly, the chance for having a pinhole defect is substantially reduced. Any pinhole defects in the ionomer layers would have to exactly overlap in order to result in a pinhole through the entire membrane of the assembly.

Durability is another advantage over membranes made, for example, with a unitary expanded PTFE support structure. Delamination over time of the ionomer from the expanded PTFE could result in a reactant leak through the membrane component. This failure mechanism is not possible by using this invention. In addition, it may be easier to recycle the components made by the use of this invention as compared to membrane electrode assemblies made using expanded PTFE re-enforcement in the membrane. Further, substantial cost savings can be realized using the instant process, since ionomer material need not be used in the sealing region. Moreover, a different material can be used in the perimetral regions of the final assemblies which can be stronger than the ionomer.

The present invention is further illustrated by the following specific example.

EXAMPLE

A Membrane Electrode Assembly was prepared by first preparing the component parts and then assembling the parts.

Nafion™ Web Formation

A coating of high viscosity NAFION™ ionomer solution was applied at a wet layer thickness of about 8 mils on a silicone coated film of biaxially oriented polyetheylene terephthalate, using a knife over roll wet layer application tool. The ionomer solution was then dried and cured by passing the web under infrared lamps of about 3 kW located 1 foot away and a blower moving air over the web for cooling. The web speed was about 0.25 meter/min. The resulting NAFION™ film was 10 microns in thickness

Catalyst Layer Web Formation

A coating of catalyst ink was applied onto an expanded Teflon® fluoropolymer film with a reinforcing backing layer. The catalyst ink was prepared by ball milling a mixture of ionomer solution and 50 weight % of platinum supported on carbon, commercially available form Engelhard. The web was dried and cured using infrared lamps as with the NAFION ionomer web.

Active Web Formation

The NAFION™ WEB and CATALYST LAYER WEB were then laminated together through a roll laminator at 0.3 meters/min with 50 psi on 2 four-inch diameter pistons one steel roller heated to 250° F. and one rubber roller not heated. Coupons of each material were cut out and the PET backing layer stripped off of the coupon bearing the ionomer. The coupons were assembled with the ionomer layers adjacent with a frame of polyimide film. The NAFION™ and catalyst surfaces were pressed together with solid backing plates. A pressure of about 25,000 lbs. was applied to the resulting assembly over a 9–10 square inch area to bond the inner components.

The resulting assembly was tested in a fuel cell and found to exhibit a high power density, and a durability of over 2000 hours.

I claim:

1. A method of manufacturing a membrane electrode assembly component comprising:
   a. applying a catalyst slurry onto a removable decal;
   b. drying the catalyst slurry to form a dried catalyst layer;
   c. applying at least one ionomer solution layer on the resulting dried catalyst layer; and
   d. at least partially curing the at least one ionomer solution layer to form a membrane electrode assembly component.

2. A method of claim 1 wherein the catalyst slurry is at least partially cured before applying the at least one ionomer solution.

3. A method of manufacturing a membrane electrode assembly comprising:
   a. applying a catalyst slurry onto a removable decal;
   b. drying the catalyst slurry to form a dried catalyst layer;
   c. applying at least one ionomer solution layer on the resulting dried catalyst layer;
   d. at least partially curing the at least one ionomer solution layer to form a membrane electrode assembly component; and
      repeating steps (a) to (d) to prepare a second membrane electrode assembly component and joining the two components together with the ionomer layers in contact with each other and removing the decals to form a membrane electrode assembly.

4. A method of claim 3 further comprising placing a perimeter sealing material partly between the two ionomer layers.

5. A method of claim 4 wherein the two decal assemblies are hot pressed together.

6. A method of claim 3 wherein the two components are hot pressed together.

7. A method of claim 6 further comprising applying a layer of diffusion medium to the outside surface of each catalyst layer.

8. A method of claim 3 further comprising placing perimeter sealing material on the outer edges of both catalyst layers.

9. A method of claim 7 further comprising partially infusing the diffusion media with a perimeter sealing material.

10. A method of manufacturing a membrane electrode assembly component comprising:
    a. applying a catalyst slurry onto a first decal;
    b. drying the catalyst slurry to form a catalyst layer;
    c. applying at least one ionomer solution layer to a second decal;
    d. drying and at least partly curing the resulting applied ionomer solution layer;
    e. joining the two decal assemblies with the ionomer and catalyst layers in contact with each other; and
    f. removing the decal from the ionomer layer to form a membrane electrode assembly component.

11. A method of claim 10 wherein each of the decals is a polymeric film.

12. A method of claim 11 wherein the decal onto which the catalyst slurry is applied consists essentially of poly (tetrafluoroethylene) film.

13. A method of claim 11 wherein the decal onto which the ionomer solution is applied consists essentially of polyester film.

14. A method of manufacturing a membrane electrode assembly comprising:
    a. applying a catalyst slurry onto a first decal;
    b. drying the catalyst slurry to form a catalyst layer;
    c. applying at least one ionomer solution layer to a second decal;
    d. drying and at least partly curing the resulting applied ionomer solution layer;
    e. joining the two decal assemblies with the ionomer and catalyst layers in contact with each other;
    f. removing the decal from the ionomer layer to form a membrane electrode assembly component; and
       and repeating steps (a) to (f) to prepare a second membrane electrode assembly component, and combining the resulting two membrane electrode assembly components by bringing the ionomer layers of each component into contact to join the ionomer layers; and removing the decals from the resulting membrane electrode assembly.

15. A method of claim 14 further comprising placing a perimeter sealing material partly between the two ionomer layers.

16. A method of claim 14 wherein a diffusion medium layer is placed on the outside surface of each catalyst layer.

17. A method of claim 14 further comprising placing perimeter sealing material on outer edges of both catalyst layers.

* * * * *